US008495289B2

(12) United States Patent
Moyer

(10) Patent No.: US 8,495,289 B2
(45) Date of Patent: Jul. 23, 2013

(54) AUTOMATICALLY DETECTING DISCREPANCIES BETWEEN STORAGE SUBSYSTEM ALIGNMENTS

(75) Inventor: Jeffrey Edwin Moyer, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 463 days.

(21) Appl. No.: 12/712,054

(22) Filed: Feb. 24, 2010

(65) Prior Publication Data

US 2011/0205658 A1    Aug. 25, 2011

(51) Int. Cl.
*G06F 13/12* (2006.01)
(52) U.S. Cl.
USPC .......................................................... 711/112

(58) Field of Classification Search
None
See application file for complete search history.

(56) References Cited

U.S. PATENT DOCUMENTS

| 6,591,339 | B1 * | 7/2003 | Horst et al. | 711/114 |
| 7,191,285 | B2 * | 3/2007 | Scales et al. | 711/114 |
| 2005/0228937 | A1 * | 10/2005 | Karr et al. | 711/6 |
| 2005/0251508 | A1 * | 11/2005 | Shimizu | 707/2 |
| 2007/0079105 | A1 * | 4/2007 | Thompson | 711/201 |

* cited by examiner

*Primary Examiner* — Duc Doan
(74) *Attorney, Agent, or Firm* — Lowenstein Sandler LLP

(57) ABSTRACT

A computer-implemented method and apparatus for detecting misalignment in a data storage stack by opening a first storage layer in the data storage stack, performing a plurality of accesses of the first storage layer, each of the plurality of accesses starting at a different offset, and determining an optimal offset based on a performance benchmark of each of the plurality of accesses.

20 Claims, 4 Drawing Sheets

AUTOMATICALLY DETECTING DISCREPANCIES BETWEEN STORAGE SUBSYSTEM ALIGNMENTS

TECHNICAL FIELD

Embodiments of the invention relate to a system for detecting misalignment in storage systems. Specifically, embodiments of the invention relate to a system for detecting discrepancies between storage subsystem alignments.

BACKGROUND

Hard disks are organized as a stack of platters. Data is stored in concentric circles, known as tracks, on the surface of each platter. Each track is divided into a number of sections called sectors. A sector is the smallest physical storage unit on a disk. There are conventionally 64 sectors in a track and a sector will typically hold about 512 bytes of data.

Electromagnetic read/write drive heads are positioned above and below each platter on the hard disk drive. The platters are spun to position the drive heads over a sector to be read from or written to. The drive heads can also move along a path from the innermost track to the outermost track of each platter, enabling a drive head to reach any sector on the surface of a platter. When reads or writes are made to a disk, they are usually done in parallel and across multiple heads, platters or even drives. The positioning of the heads is often described with relation to a cylinder, head and sector (CHS) notation. However, disk drives, in fact, now have more complicated organization, which varies from drive to drive and manufacturer to manufacturer.

The exterior cylinders on each platter have physically larger tracks. Some manufacturers have increased the number of sectors in the outer cylinders relative to those in inner cylinders. This increases the capacity and eliminates wasted space on the hard disk. One common technique used for organizing hard disks is zoned bit recording (ZBR). With this technique, tracks are grouped into zones based on their distance from the center of the disk and each zone is assigned a number of sectors per track. In addition, some hard disks export a logical sector size of 512 bytes, but implement a 4 KB internal block size. This makes it difficult for a user to determine the internal layout of the hard disk. Thus, current hard disks use many complex internal structures making it difficult if not impossible for a user to know the real organization of a hard disk because the number of sectors per track is variable. Also, many hard disks are organized as part of an array, such as a redundant array of inexpensive disks (RAID). When using a RAID configuration, data is read in stripes, which is a unit corresponding to the amount of data that is read across all of the disk drives in a RAID concurrently.

When data is read from a hard disk drive or a set of hard disk drives, the operation is most efficient if it is read in a single read operation or a minimal number of read operations. This is affected by the alignment of the hard drives and the RAID. Alignment is the selection of a starting sector for making reads or writes. Often, many hard disks have a set of hidden sectors and a setting indicates that read/write operations should start in a sector immediately after these hidden sectors. The hidden sectors are sectors that store partition tables or similar data structures and are generally made inaccessible. The structure and placement of partitions on a hard drive are defined by partition tables. Each partition is a subset of the storage space on the hard drive. The partition table defines the starting sector associated with each partition in which read/write operations should start. Typically, the first partition starts at sector 63. However, depending on the size of partitions and the structure of the hard drives, file allocation units, blocks and stripes may not be aligned with the starting sector for reads and writes. Instead, data is stored across these boundaries when it is possible that they could have been stored within the boundaries of the file allocation units, blocks and stripes. Extra reads and writes are required to access this data thereby diminishing the efficiency of this system.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
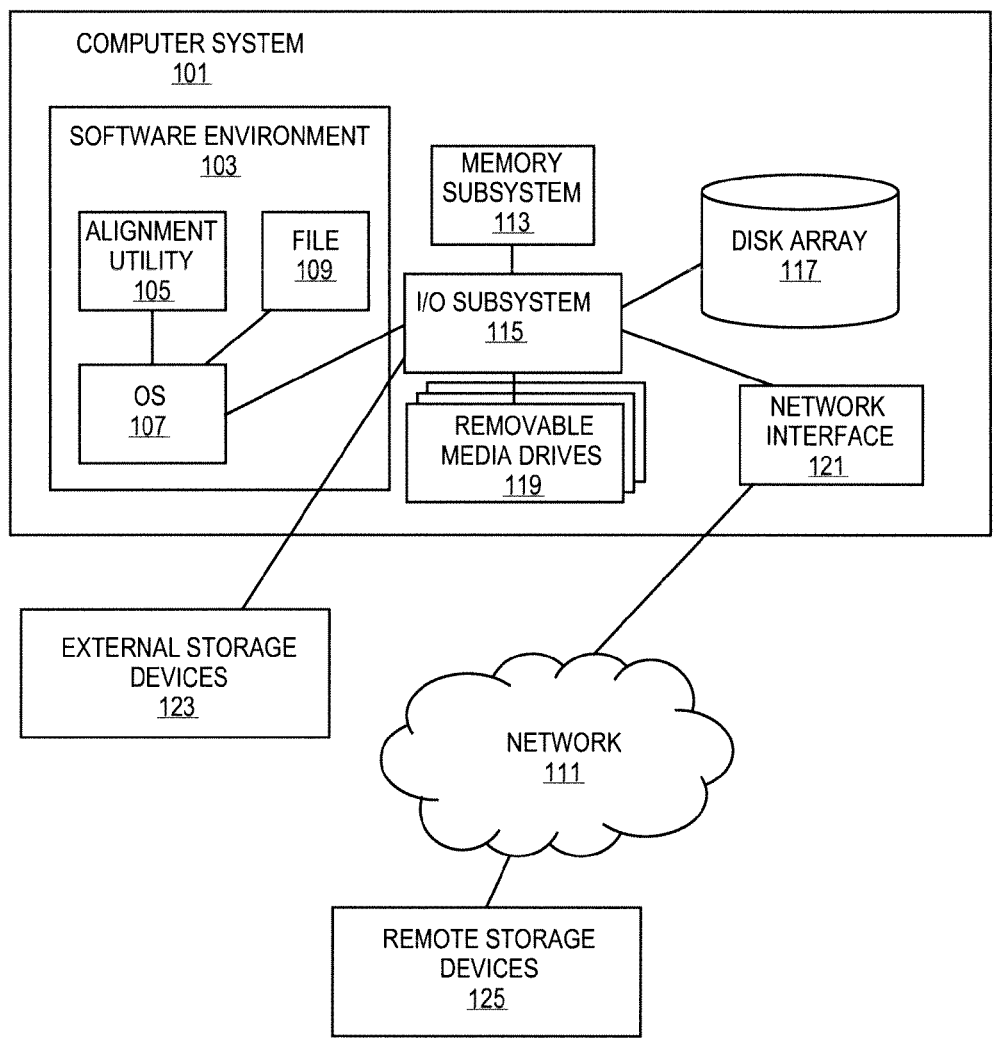
FIG. 1 is a diagram of one embodiment of a system including an alignment utility.

FIG. 1 is a block diagram illustrating a system for optimized disk alignment. In one embodiment, the system includes a computer system 101, set of external storage devices 123 and a set of remote storage devices 125. Remote storage device 125 can be in communication with the computer system 101 over a network 111. The network 111 can be any type of communication system including a local area network (LAN), a wide area network (WAN), such as the Internet, or similar communication system. The computer system 101 can be any type of computing device including a desktop computer, a server, a laptop computer, a handheld device or similar computing device. The external storage devices 123 can be any type of storage devices connected to the computer system 101 through a universal serial bus (USB) connection, wireless connection or similar communication medium. The external storage devices 123 can include hard disk drives, memory sticks, removable media drives or similar storage devices. Similarly, the remote storage devices 125 can be hard disk drives, memory devices, removable media drives or similar types of storage devices. The remote storage devices 125 can be in direct communication with the computer system 101 over the network 111 or there may be any number of intermediate machines between the computer system 101 and the remote storage device 125 that facilitate the communication.

In one embodiment, the computer system includes a software environment 103, an I/O subsystem 115, a memory subsystem 113, a set of removable media drives 119, a networking interface 121 and a set of disk drives 117. The network interface 121 can be any type of network communication device suitable for communicating with remote storage devices over network 111. The I/O subsystem 115 can be any type of communication subsystem within the computer system 101 for facilitating communication between the components of the computer system 101 such as a peripheral component interconnect (PCI) express, PCI or similar subsystems, which can be implemented in an I/O controller, north/south bridge controllers or similar controller systems. The I/O subsystem 110 can also manage the communication between each of the other subsystems including the memory subsystem 113, removable media drives 119, a disk array 117 and the network interface 121.

Memory subsystem 113 can include any number of memory devices that can be random access memory (RAM) devices, static memory devices or similar types of memory devices. Removable media drives 119 can be any type of storage devices that are removably attached to the computer system 101 through a drive or port of the computer system. These removable media drives can include USB memory sticks, zip drives, tape drives, CD-ROM drive units, removable hard drives and similar types of removable media.

Disk array 117 can encompass any number of hard disk drives or similar types of fixed storage devices. These hard disk drives can be arranged as a RAID or similar array of storage devices. RAID array types can include RAID-0-RAID-6 or similar RAID type or combinations thereof such as RAID 1+0 (i.e., RAID 10). In other embodiments, the disk array 117 spans both local and remote or external devices.

Software environment 103 can be any set of software to control and interact with the other components of the computer system 101 that can be executed by a processing device or a set of processing devices within the computer system 101. Software environment 103 can include any type of platform, operating system 107 or similar software. The software environment 103 includes an alignment utility 105 and a set of files 109. Alignment utility 105 functionality is described in greater detail herein below. File 109 can be a file in a set of files that is physically stored on any of the storage devices and can be accessible in the software environment as a file descriptor or similar item. Similarly, each of the storage devices can be accessed by the software environment 103, including the alignment utility 105 through a file descriptor as a block device or through a similar interface.

Figure 2:
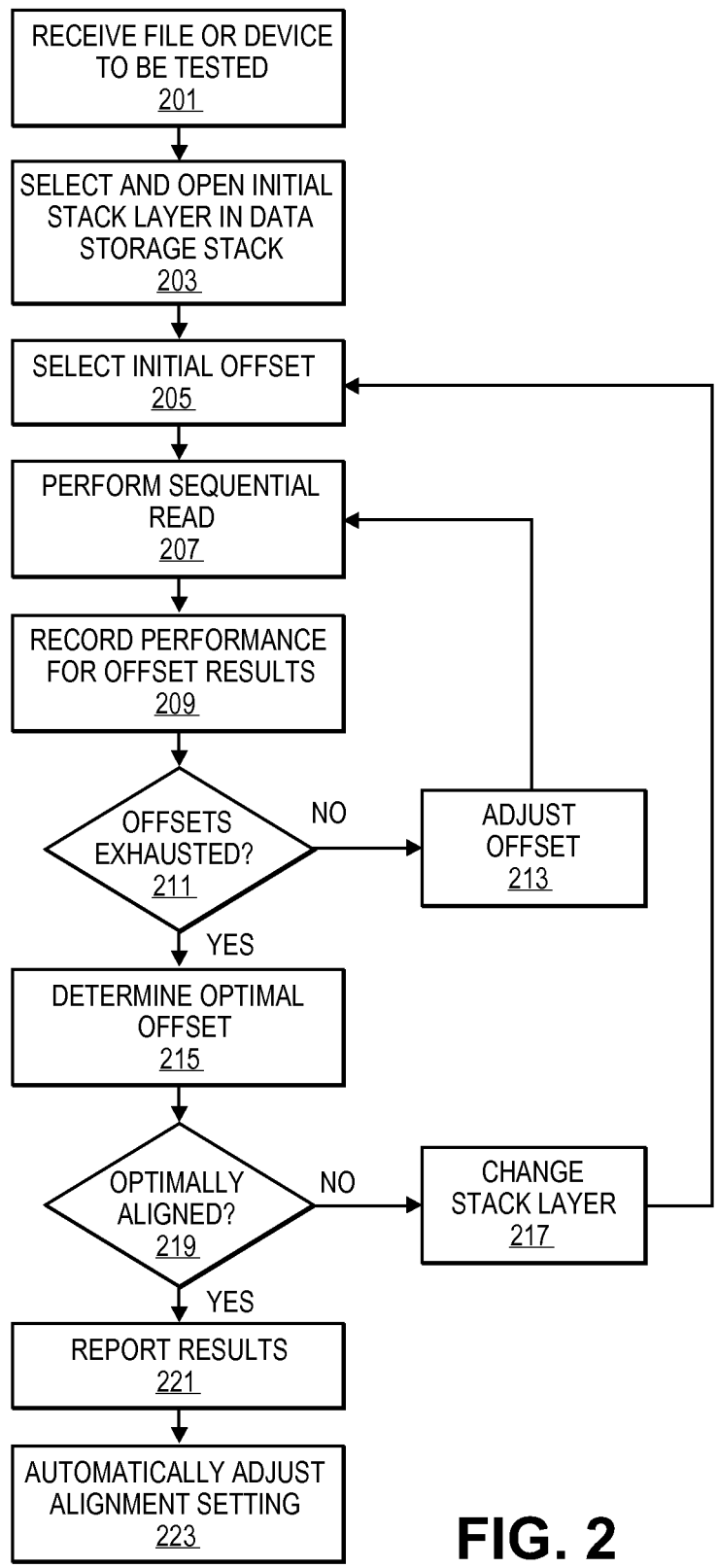
FIG. 2 is a flowchart of one embodiment of a process for determining an optimal alignment.

FIG. 2 is a flowchart of one embodiment of a process for determining optimal disk alignment. The process can be implemented as an alignment utility that is executed by an operating system or similar platform. In one embodiment, the process is started by initiation of the alignment utility by a user (Block 201). The user can specify a file or device to be tested (Block 201). The file or device to be tested can be specified as a file, file descriptor, block device or similarly input as a parameter through a user interface of the utility. Any file that is utilized can be either a pre-existing file or a file that is created for testing purposes. A check can be made to verify that any specified file exists. The file or device is associated with a data storage stack. A data storage stack is an abstract of the various aspects of data storage such as a file layer, cache layer, device layer and similar aspects that affect the storage of data. An initial stack layer in a data storage stack is then selected and opened (Block 203). The initial stack layer can also be designated by the user as an input or a parameter of the alignment utility. In other embodiments, the alignment utility can automatically default to or select a particular layer of the data storage stack. For example, the lowest layer of the stack can be selected as a default or the highest level of the stack can be selected as the default. Selecting a stack layer includes opening the stack layer for reading, for example, a file can be opened or a file descriptor obtained for a storage device.

The utility then selects an initial offset (Block 205). The initial offset can again be selected by the user or there can be a default initial offset for the alignment utility. An offset is an adjustment to a starting location for a read or write. Starting at the initial offset, the utility starts a set of accesses that can be a set of sequential reads or writes, a set of random reads or writes or similar accesses to the designated file or device to be tested (Block 207). The size of the access can include several file allocation units, blocks or clusters and can be any size up to the size of a stripe unit. The speed at which the access is performed is recorded as performance benchmark for the specific offset (Block 209). A check is then made to determine if the range of offsets to be tested has been exhausted (Block 211). The range of offsets can depend on the type of file or device being tested. The range of offsets can be co-extensive with a size of a stripe unit or can have a similar range. For example, a stripe unit size can define an upper bound for a range of offsets to be tested. This iteratively tested range of offsets can be pre-defined or dynamic. If the offsets have not been exhausted then the next offset to be tested is selected (Block 213). The offsets can be iteratively tested in sequence or the offsets to be tested can be organized to prioritize certain offsets such as a set of commonly used offsets or to only test a set of commonly used offsets.

After all the offsets have been exhausted, then a determination of an optimal offset based on the recorded performance of each of the offsets is made (Block 215). The highest performance offset is selected for the optimal alignment, that is, the offset associated with the best performance benchmark is selected. A check is then made to determine if the selected optimal offset provides a proper overall optimal alignment for the data stack (Block 209). If the result is not the proper overall alignment, then the layer of the data stack that has been tested can be changed (Block 217). Each layer of the stack can be tested until a proper alignment is determined. Proper overall alignment can be determined by comparing an offset for a particular data layer with the results of other layers or based on user input or feedback.

Once the proper overall alignment has been determined, results can be reported to a user (Block 221). The results can include any of the performance benchmark results recorded during the testing as well as an indication of the optimal alignment for the entire data stack or any layer thereof based on these results. The results can also identify the storage layer or device that is causing an overall misalignment and impacting the efficiency of read and write operations. In one embodiment, the alignment utility can automatically adjust the alignment settings to utilize the optimal offsets for each layer of the data stack (Block 223). In one embodiment, the storage stack is modified by inserting another layer using a device-mapper target to remap sectors. In another embodiment, the storage stack is modified by inserting a layer that remaps sectors. In further embodiments, automated adjustment is omitted.

Figure 3:
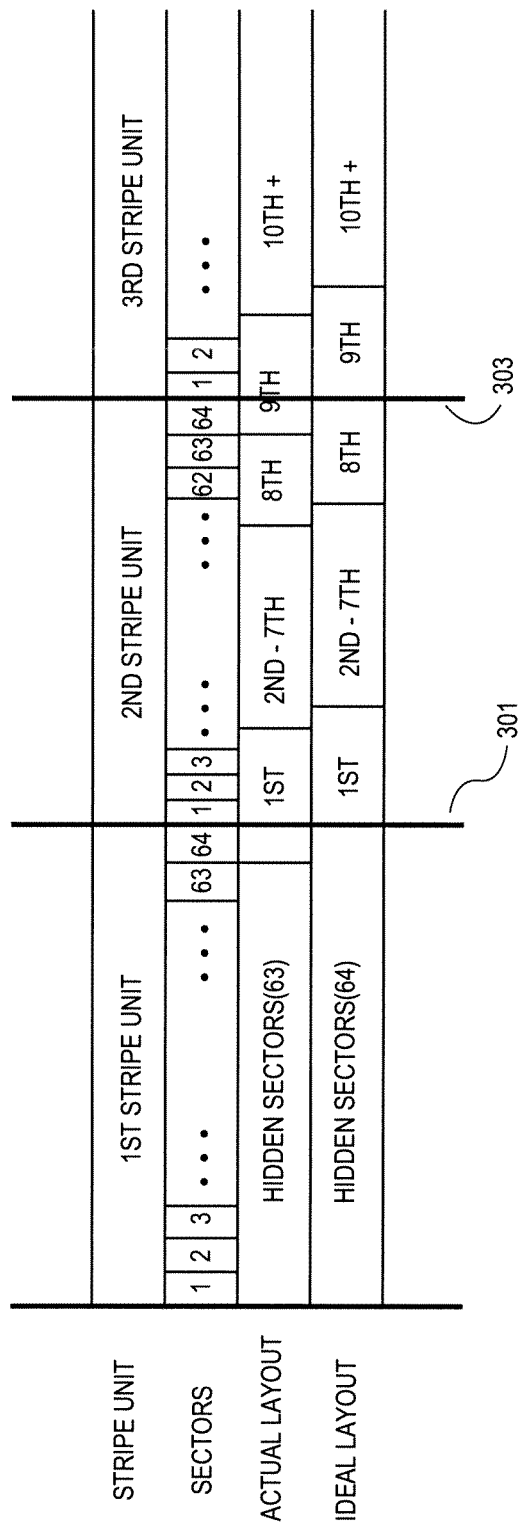
FIG. 3 is a diagram of an example hard drive or storage unit alignment.

FIG. 3 is a diagram of one embodiment of an example organization of a physical disk being tested. This example is an abstract representation of an alignment of a hard disk that is part of a RAID. The stripe unit layer shows the relative size of each stripe for the RAID. The stripe unit boundaries are identified by lines 301 and 303. The sectors of the disk are shown relative to the stripe units. In this example, for each stripe unit there are 64 sectors. The actual layout of the disk is shown in the next level where there are 63 hidden sectors and the first file allocation unit, block or cluster immediately follows in the $64^{th}$ sector and is four sectors in size. Thus, the first allocation unit, block or cluster straddles the stripe unit boundary 301. As a result, to read or modify this file allocation unit, block or cluster, two reads or writes are necessary. One read of each stripe containing the two halves of the file allocation unit, block or clusters are necessary.

The next layer in the diagram shows an ideal layout where the alignment has been adjusted such that 64 hidden sectors are utilized. The actual 63 hidden sectors have been augmented with an additional hidden sector solely for the purpose of aligning the first file allocation unit, block or cluster to start at the beginning of the next stripe unit. As a result, all the following file allocation units, blocks or clusters are within a single stripe, such as the $9^{th}$ file allocation unit, block or cluster, which starts at the third stripe unit. As a result, the ideal layout will require fewer reads and writes to obtain the same data, because none of the file allocation units, blocks or clusters straddle any of the stripe unit boundaries.

Figure 4:
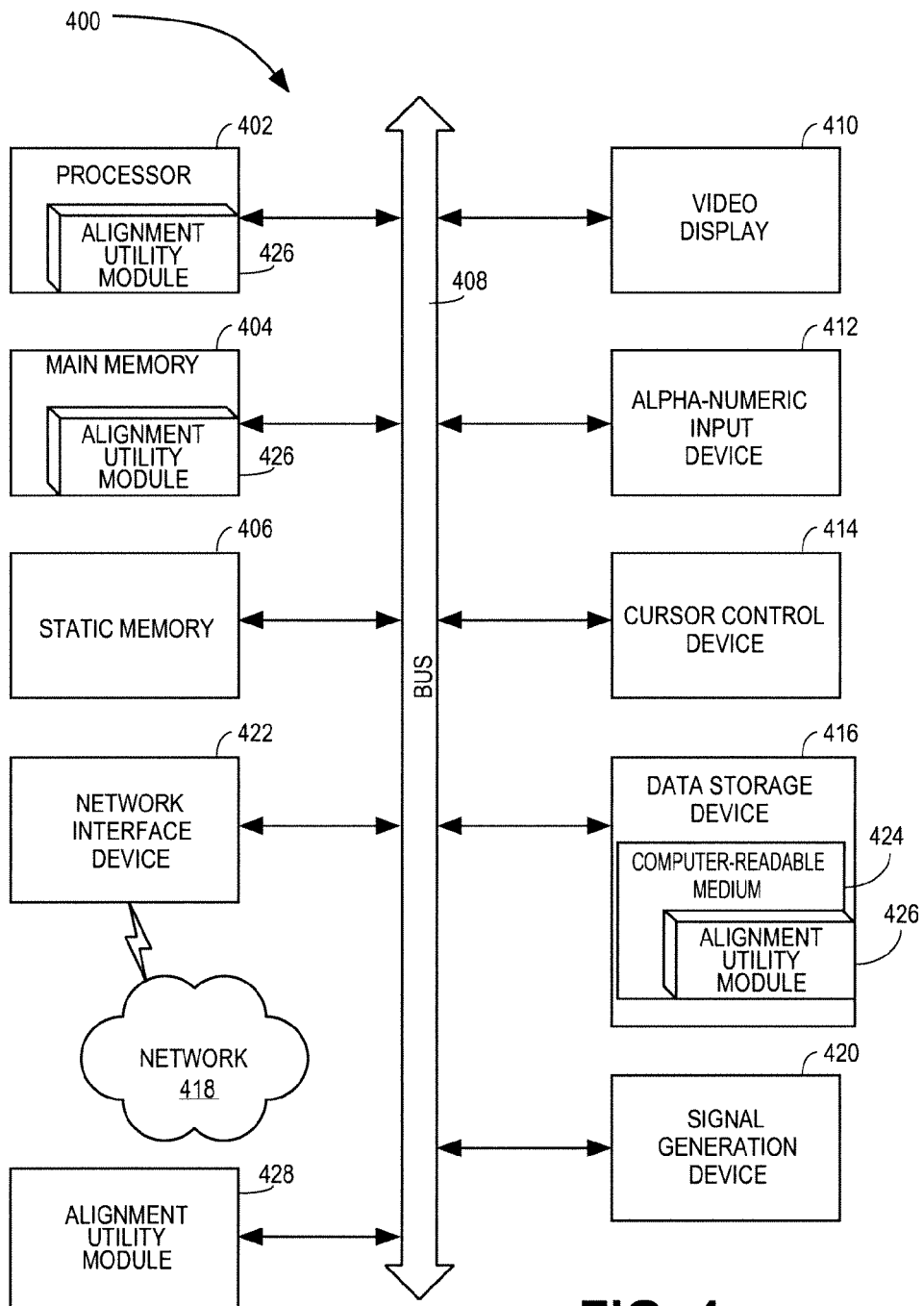
FIG. 4 is a diagram of one embodiment of a system including an alignment utility.

FIG. 4 is a diagram illustrating one embodiment of a system implementing the alignment utility. Within the computer system 400 is a set of instructions for causing the machine to perform any one or more of the methodologies discussed herein. In alternative embodiments, the machine can be connected (e.g., networked) to other machines in a LAN, an intranet, an extranet, or the Internet. The machine can operate in the capacity of a server or a client machine (e.g., a client computer executing the alignment utility) in a client-server network environment, or as a peer machine in a peer-to-peer (or distributed) network environment. The machine can be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g. computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

The processing device 402 represents one or more general-purpose processing devices such as a microprocessor, central processing unit, or the like. More particularly, the processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 402 can also be one or more special-purpose processing devices such as an application specific integrated circuit (ASIC), a field programmable gate array (FPGA), a digital signal processor (DSP), network processor, or the like. The processing device 402 is configured to execute the alignment utility 426 for performing the operations and steps discussed herein.

The computer system 400 can further include a network interface device 422. The computer system 400 also call include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 can include a machine-readable storage medium (or more specifically a computer-readable storage medium) 424 on which is stored one or more sets of instructions (e.g., alignment utility 426) embodying any one or more of the methodologies or functions described herein. The alignment utility 426 can also reside, completely or at least partially, within the main memory 404 and/or within the processing device 502 during execution thereof by the computer system 400, the main memory 404 and the processing device 402 also constituting machine-readable storage media. The alignment utility 426 may further be transmitted or received over a network 418 via the network interface device 422.

The machine readable storage medium 424 can also be used to store the alignment utility 426 persistently. While the machine-readable storage medium 426 is shown in an exemplary embodiment to be a single medium, the term "machine-readable storage medium" and also "computer-readable storage medium" should be taken to include a single medium or multiple media (e.g., a centralized or distributed database, and/or associated caches and servers) that store the one or more sets of instructions. The terms "machine-readable storage medium" and "computer-readable storage medium" shall also be taken to include any medium that is capable of storing or encoding a set of instructions for execution by the machine and that cause the machine to perform any one or more of the methodologies of the present invention. The terms "machine-readable storage medium" and "computer-readable storage medium" shall accordingly be taken to include, but not be limited to, solid-state memories, and optical and magnetic media.

In one embodiment, the method for alignment discussed herein can be implemented as a discrete component of the computer system. An alignment utility module 428 can communicate with the other component of the computer over the bus 408 thereby allowing any of the other components to access the functionality of the alignment utility module 428.

In the above description, numerous details are set forth. It will be apparent, however, to one skilled in the art, that the present invention can be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "opening," "performing," "determining," "incrementing," "charging," "generating," "setting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in microcoded hardware components.

Thus, a method and apparatus for disk alignment has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   opening a first stack layer in a data storage stack;
   performing a plurality of accesses to the first stack layer, each of the plurality of accesses starting at a different offset;
   determining an optimal offset of the first stack layer by a processing device in view of a performance benchmark of each of the plurality of accesses performed at each of the different offsets; and
   determining if the optimal offset of the first stack layer provides an optimal alignment for the data storage stack by comparing the optimal offset of the first stack layer with an optimal offset of a second stack layer.

2. The computer-implemented method of claim 1, further comprising:
   changing the first stack layer to the second stack layer; and
   performing a plurality of accesses of the second stack layer to determine whether the second stack layer is causing a misalignment in the data storage stack.

3. The computer-implemented method of claim 1, wherein the first stack layer is any one of a hard disk, a removable media drive, a memory device, a cache device or a file.

4. The computer-implemented method of claim 1, further comprising:
   generating a display of a report of the performance benchmark of each of the plurality of accesses.

5. The computer-implemented method of claim 1, further comprising:
   performing an access at any offset based on user defined parameters.

6. The computer-implemented method of claim 1, wherein a stripe unit size defines an upper bound for the offset.

7. The computer-implemented method of claim 1, further comprising:
   automatically setting the offset for a storage device to the optimal offset.

8. The computer-implemented method of claim 1, wherein the performing a plurality of accesses to the first stack layer comprises performing one of the plurality of accesses at a first offset and performing one of the plurality of accesses at a second offset, and further comprising testing at the second offset and further comprising obtaining a performance benchmark of the second offset.

9. A system comprising:
   a processing device; and
   an I/O subsystem coupled to the processing device, the I/O subsystem comprising a storage device; and
   an alignment utility implemented by the processing device to determine an optimal offset of a first stack layer for the storage device in view of a performance benchmark of each of the plurality of accesses performed at each of the different offsets and to determine if the optimal offset of the first stack layer provides an optimal alignment for the storage device by comparing the optimal offset of the first stack layer with an optimal offset of a second stack layer.

10. The system of claim 9, wherein the alignment utility is to determine a location of a misalignment of a storage layer.

11. The system of claim 9, wherein the alignment utility iteratively tests each offset up to a pre-defined data unit size.

12. The system of claim 11, wherein the storage device is any one of a disk array, a memory device or a removable media device.

13. A non-transitory machine-readable storage medium having a set of instructions stored therein which when executed cause a processing device to perform a set of operations comprising:
   opening a first stack layer in a data storage stack;
   performing a plurality of accesses of the first stack layer, each of the plurality of accesses starting at a different offset;
   determining, by the processing device, an optimal offset of the first stack layer in view of a performance benchmark of each of the plurality of accesses performed at each of the different offsets; and
   determining if the optimal offset of the first stack layer provides an optimal alignment for the data storage stack by comparing the optimal offset of the first stack layer with an optimal offset of a second stack layer.

14. The non-transitory machine-readable storage medium of claim 13, having further instructions stored therein, which when executed cause the processing device to perform the set of operations further comprising:
   changing the first stack layer to the second stack layer; and
   performing a plurality of accesses of the second stack layer to determine whether the the second stack layer is causing a misalignment in the data storage stack.

15. The non-transitory machine-readable storage medium of claim 13, wherein the first stack layer is any one of a hard disk, a removable medium drive, a memory device, a cache device or a file.

16. The non-transitory machine-readable storage medium of claim 13, having further instructions stored therein, which when executed cause the processing device to perform the set of operations further comprising:
   generating a display of a report of the performance benchmark of each of the plurality of accesses.

17. The non-transitory machine-readable storage medium of claim 13, having further instructions stored therein, which when executed cause the processing device to perform the set of operations further comprising:
   performing a access at any offset based on user defined parameters.

18. The non-transitory machine-readable storage medium of claim 13 wherein a stripe unit size defines an upper bound for the offset.

19. The non-transitory machine-readable storage medium of claim 13, having further instructions stored therein, which when executed cause the processing device to perform the set of operations further comprising:
   automatically setting the offset for a storage device to the optimal offset.

20. The non-transitory machine readable storage medium of claim 13 having further instructions stored therein, which when executed cause the processing device to perform the set of operations further comprising testing at the second offset and further comprising obtaining a performance benchmark of the second offset, wherein the performing a plurality of accesses to the first stack layer comprises performing one of the plurality of accesses at a first offset and performing one of the plurality of accesses at a second offset.

* * * * *